United States Patent [19]

Park

[11] Patent Number: 4,894,395

[45] Date of Patent: Jan. 16, 1990

[54] EXPANDABLE POLYOLEFIN COMPOSITIONS AND POLYOLEFIN FOAM PREPARATION PROCESS

[75] Inventor: Chung P. Park, Pickerington, Ohio

[73] Assignee: The Dow Chemical Company, Midland, Mich.

[21] Appl. No.: 138,907

[22] PCT Filed: Jan. 21, 1987

[86] PCT No.: PCT/US87/00139

§ 371 Date: Sep. 21, 1987

§ 102(e) Date: Sep. 21, 1987

[87] PCT Pub. No.: WO87/04445

PCT Pub. Date: Jul. 30, 1987

[51] Int. Cl.$^4$ .................................................. C08J 9/14
[52] U.S. Cl. .................................... 521/79; 264/53; 264/DIG. 5; 521/134; 521/143; 521/149; 521/910
[58] Field of Search ................. 521/79, 143, 910, 134; 264/53, DIG. 5

[56] References Cited

U.S. PATENT DOCUMENTS

| | | | |
|---|---|---|---|
| 4,101,467 | 7/1978 | Park | 521/79 |
| 4,368,276 | 1/1983 | Park | 521/143 |
| 4,370,378 | 1/1983 | Zabrocki et al. | 521/81 |
| 4,395,510 | 7/1983 | Park | 521/79 |
| 4,431,575 | 2/1984 | Fujie et al. | 521/79 |
| 4,522,955 | 6/1985 | Fukushima et al. | 521/79 |
| 4,569,950 | 2/1986 | Hoshi et al. | 521/79 |
| 4,694,027 | 9/1987 | Park | 521/134 |

*Primary Examiner*—Morton Foelak

[57] ABSTRACT

The use in otherwise conventional polyolefin extrusion foaming process of a stability control agent, in conjunction with certain binary or tertnary mixed blowing agent systems containing 1,2-dichlorotetrafluoroethane provides closed-cell olefin polymer foam articles having increased maximum cross-sections, smooth skins and good dimensional stability.

15 Claims, No Drawings

EXPANDABLE POLYOLEFIN COMPOSITIONS AND POLYOLEFIN FOAM PREPARATION PROCESS

BACKGROUND OF THE INVENTION

The present invention relates to a process for the preparation of olefin polymer foams and, in particular, to an extrusion foaming process for olefin polymers using a stability control additive in conjunction with a blowing agent mixture.

In addition, the present invention also relates to an expandable olefin polymer composition containing the indicated stability control additive and mixed blowing agent system admixed therein and to polyolefin foams prepared therefrom.

It is well known to prepare olefin polymer foams by heat plastifying a normally solid olefin polymer resin, admixing such heat plastified resin with a volatile blowing agent under heat and pressure to form a flowable gel and thereafter extruding the gel into a zone of lower pressure and temperature to expand and cool the gel to form the desired solid olefin foam product.

Until very recently, there had been used only one blowing agent (i.e., 1,2-dichlorotetrafluoroethane) providing sufficient dimensional stability during the curing period.

However, a problem frequently encountered in preparing foams especially of very low density employing 1,2-dichlorotetrafluoroethane as a blowing agent is a limitation on the cross-sectional size of foamed product having smooth skin. This problem occurs when the die opening is increased to provide foam having a larger cross-section because the decrease in hydrostatic pressure in the die causes prefoaming with the result that the extruded foam has a rough skin and/or is physically deformed.

More recently, certain technology has been developed in the area of stability control agents in an attempt to permit the obtention of commercially acceptable dimensional stability with a wider range of volatile halogenated hydrocarbon blowing agents. (See, for example, U.S. Pat No. 3,644,230 and U.S. Pat. No. 4,214,054). Unfortunately, these techniques, while generally providing low density ethylenic polymer foams having improved dimensional stability, are also somewhat limited in terms of the maximum cross-section of the foam articles that can be obtained therewith from a given type of extrusion apparatus. Accordingly, it would be highly desirable to provide an improved extrusion foaming process capable of producing low density olefin polymer foam articles having both relatively large cross-sectional areas (e.g., providing an increase in the maximum achievable foam cross-sectional area which can be obtained with a given extrusion apparatus) and good dimensional stability as well as other desirable foam properties such as closed cells of small cell size and the like.

SUMMARY OF THE INVENTION

In accordance with the present invention such a process for preparing closed-cell olefin polymer foam articles having increased maximum achievable cross-sectional areas on a given type or size of extrusion apparatus and having good dimensional stability and smooth skin is provided along with an expandable olefin polymer composition suitable for use therein. In such process, (A) a normally solid olefin polymer resin is heat plastified and intimately admixed, under elevated temperature and pressure,
  (1) with a stability control agent, and
  (2) with a mixed blowing agent selected from the group consisting of:
    (a) a mixture comprising, 1,2-dichlorotetrafluoroethane, from about 50 to about 95 weight percent, and from about 5 to about 50 weight percent of an aliphatic hydrocarbon, a halogenated hydrocarbon compound physical blowing agent, or mixture thereof having an atmospheric pressure boiling point which is greater than that of 1,2-dichlorotetrafluoroethane (i.e. about 3.55° C.) to about 50° C., or
    (b) a mixture which comprises from about 5 to about 85 percent of 1,2-dichlorotetrafluoroethane, from about 5 to about 85 percent of dichlorodifluoromethane and from about 5 to about 50 weight percent of an aliphatic hydrocarbon, a halogenated hydrocarbon compound physical blowing agent or mixture thereof having an atmospheric pressure boiling point of from about 0° C. to about 50° C.

(B) the resultant mixture is then extruded into a zone of lower pressure and cooled to thereby form an olefin polymer foam.

The aforementioned process is particularly well suited for the preparation of closed-cell olefin polymer foamed articles of relatively low density, e.g., from about 0.6 to about 6 (especially from about 1 to about 3) pounds per cubic foot (pcf) (0.01 to 0.1 preferably 0.01 to 0.05 gram/cc) having relatively small or fine cell size and having relatively large cross-sectional areas (e.g., cross-sectional areas in excess of 50 square inches (320 square centimeters) taken in a plane perpendicular to the direction of extrusion of the foamed article involved) In addition, such process is especially advantageous in that it permits the preparation of such articles without excessive shrinkage during the manufacture thereof and/or during the storage thereof in fresh foam (i.e., partially cured) form. That is, the resulting foamed articles have, in fresh foam form, relatively good ambient temperature (e.g., 70° F. (21° C.)) dimensional stability; typically shrinking to no less than about 85 (preferably no less than about 90 and most preferably no less than about 95) percent of their initial foamed volume under such manufacturing and/or storage (e.g., aging or curing) conditions. In addition, such foamed articles also have, in fresh foam form, relatively good elevated temperature stability; typically shrinking to no less than about 80 (preferably no less than about 85) percent of their original volume during prolonged exposure at 150° F. (65° C.). The foam articles also can be prepared having a smooth skin.

DETAILED DESCRIPTION OF THE INVENTION

Olefin polymer resins suitably used in the practice of the present invention include ethylene homopolymers such as low, linear low, medium or high density polyethylene, and ethylene copolymers such as ethylene-vinyl acetate copolymers, ethylene-propylene copolymers, ethylene-1-butene copolymers, ethylene-butadiene copolymers, ethylene-vinyl chloride copolymers, ethylene-methyl methacrylate copolymers, ethylene-acrylonitrile copolymers, ethylene-acrylic acid copolymers and the like. As the olefin polymer resin, it is preferable to use an ethylene content above 50 percent by weight, preferably above 75 percent by weight. Blends of two or more of such olefin polymer resins can also be suitable employed in the practice of the present invention.

Stability control agents are used which function to control the dimensional stability of the foams during the curing period. Stability control agents suitable for use herein include the long-chain fatty acid/polyol partial esters described in U.S. Pat. No. 3,644,230, as well as higher alkyl amines, saturated higher fatty acid amides and complete esters of higher fatty acids such as those described in U.S. Pat. Nos. 4,214,054 and 4,395,510 or mixtures thereof. The pertinent teachings of such patents are hereby incorporated by reference thereto. Such stability control agents are employed in an amount ranging from 0.1 to about 10 weight percent based upon the weight of the olefin polymer employed and preferably they are employed at a level of from about 0.5 to about 5 weight percent of such olefin polymer resin. Preferred stability control agents are stearamide and stearyl stearamide.

In addition to (or in place of) the foregoing stability control agents, there may also be employed for such purpose substantially non-neutralized and neutralized copolymers of α-olefins with various monoethylenically unsaturated carboxylic acids such as, for example, copolymers of a major portion of ethylene containing copolymerized therewith a minor proportion of a monoethylenically unsaturated carboxylic acid such as acrylic acid, methacrylic acid and the like. Suitable copolymers are taught, for example, in U.S. Pat. No. 4,331,799 the pertinent teachings of which are specifically incorporated herein by reference. Preferred carboxyl-bearing copolymers for such permeability modification include ethylene-acrylic acid copolymers having from about 3 to about 45, preferably from about 15 to about 45 weight percent of acrylic acid copolymerized therein. When such carboxyl-containing copolymers are used, the amount of their usage is not particularly critical so long as a sufficient amount is employed to impart the desired dimensional stability to the resulting olefin polymer foam product. However, as a general rule (a) when the carboxyl-containing polymer contains relatively lower proportions of acid monomer (e.g., from 3 to about 15 weight percent based upon such carboxylpolymer) it will typically be employed in relatively larger proportions (e.g., from about 40 to about 90 weight percent of the total polymer solids), and (b) when such carboxyl-polymer contains higher levels of carboxylic acid monomer therein (e.g., from about 15 to about 45 weight percent based upon the carboxyl polymer) then such carboxyl-containing polymer will typically be used in the range of from about 15 to about 40 weight percent of the total polymer solids employed in the extrusion foaming process. When the olefin polymer to be foamed itself functions as a stability control agent (e.g., substantially non-neutralized copolymers of ethylene and a monoethylenically unsaturated carboxylic acid such as acrylic acid, etc.), the addition of a further stability control agent as a separate additional ingredient is not necessary since in that event such polymer performs the dual function of being both the polymer to be foamed as well as being its own stability control agent.

The term "substantially non-neutralized" as used herein with reference to carboxyl-containing polymers is intended to refer to such polymers in which only a small amount (e.g., less than 5 percent and preferably essentially none) of the carboxyl groups therein is neutralized or crosslinked with a metal ion and such term thus excludes those neutralized carboxyl-bearing ethylenic copolymers commonly referred to in the art as ionomers. However, as stated herein, ionomers are also suitable as stability control agents.

An important feature of the present invention is the use as the blowing agent herein of the mixed blowing agent system described hereinbefore. Preferably, such mixed blowing agent system (a) contains from about 5 to about 40 (more preferably from about 5 to 35, most preferably from about 5 to about 25 and especially about 20) weight percent of the indicated 3.55° C.–50° C. boiling point aliphatic hydrocarbon (and/or halogenated hydrocarbon) compound with the remainder of such system being 1,2-dichlorotetrafluoroethane, or (b) a mixture which comprises from preferably about 5 to about 85 weight percent (more preferably about 15 to about 75 weight percent) 1,2-dichlorotetrafluoroethane, preferably about 5 to about 85 weight percent (more preferably about 15 to about 75 weight percent) of dichlorodifluoromethane and preferably about 5 to about 50 weight percent (more preferably about 5 to about 35 weight percent) of the indicated 0° C.–50° C. physical blowing agent.

These preferred ranges are based on dimensional stability and maximum achievable foam cross-section.

Suitable 0° C.–50° C. boiling point aliphatic hydrocarbon and halogenated hydrocarbon compounds for use in the aforementioned mixed blowing agent system include n-butane, n-pentane, isopentane, neopentane and trichlorotrifluoroethane, dichloromonofluoromethane, ethyl chloride, 1-chloropropane, 2,2-dimethybutane, methylene chloride, CFC-21, trichlorofluoromethane. Preferred 0° C.–50° C. boiling point aliphatic or halogenated hydrocarbon compounds for use herein include trichlorofluoromethane and ethyl chloride.

In practice, the amount of the aforementioned mixed blowing agent employed in practicing the present invention will vary and will be dictated primarily by the particular foam density sought to be manufactured via such process. However, as a general rule the amount of such mixed blowing agent employed will typically be in the range of from about 0.013 to about 0.50 gram-mole of the combined mixed blowing agent per 100 grams of the olefin polymer resin to be foamed therewith.

In addition to the hereinbefore described ingredients, there may also be employed in the practice of the present invention other ingredients or additives which conventionally find applicability in known extrusion foaming processes such as, for example, known nucleating (or cell-size controlling) agents (e.g., talc, clay, mica, silica, titanium oxide, zinc oxide, calcium silicate, metallic salts of fatty acids such as barium stearate, zinc stearate, aluminum stearate, etc.), wetting agents, and the like.

The following examples, in which all parts and percentages are on a weight basis unless otherwise indicated, are presented as illustrative of the present invention and are not to be understood as limiting its scope.

EXAMPLE I

The apparatus used in this example is a 1¼ screw type extruder having additional zones for mixing and cooling at the end of usual sequential zones for feeding, melting and metering. An opening for blowing agent injection is provided in the extruder barrel between the metering and mixing zones. At the end of the cooling zone, there is attached a die orifice having an opening of rectangular shape.

One hundred parts of a granular polyethylene having 2.3 melt index (determined by ASTM D-1238 Procedure E) and 0.923 g/cm$^3$ (57.6 pcf) density was mixed with one part of talcum powder by the use of a small amount of a wetting agent. Two parts by weight of a mixed fatty acid amide stability control agent was additionally blended in for stability control. The stability control agent was a mixture of KEMAIDE S-180 brand stearyl stearamide and KEMAMIDE S brand stearamide produced by Humko Chemical Division of Witco Chemical Corp. The mixture ratio was varied from test to test. The amides were compounded with the base resin to a 25 percent concentrate in advance in order to make feeding in the extruder easy. The mixture was fed into the extruder at an essentially uniform rate of approximately 10 pounds (4.54 kilograms) per hour. A blowing agent consisting of a mixture of 1,2-dichlorotetrafluoroethane (R-114) and ethyl chloride (EtCl) was injected into the extruder at an aimed rate of about 0.17 lb moles per hundred pounds 0.17 kg moles per hundred kilograms of polymer. The temperatures of the extruder zones were set at 80° C. at the feeding zone, 170° C. at the melting and metering zone and 168° C. at the mixing zone. The temperature of the cooling zone was adjusted so as to cool the gel uniformly down to a foaming temperature of about 108° C. The gap of the die opening was carefully adjusted in order to determine the threshold die gap for prefoaming which is called the critical die gap hereinafter. Thickness, width, and density of fresh foam were determined within about five minutes after extrusion. Foam width ranged from about 1.15 to 1.30 inches (2.92 to 3.30 centimeters). The maximum cross-section was estimated from the thickness and width data. Foam specimens of about 7 inches (17.8 centimeters) long were cut from the strand and subjected to dimensional stability tests both at ambient and elevated temperatures.

The test results are set forth in Table I. The critical die gap and the resultant achievable foam cross-sectional size increase as the ethyl chloride level in the mixture increases. However, foam dimensional stability deteriorates as the ethyl chloride level increases. Foams expanded with a 60/40 mixture of R-114/EtCl shrink to a minimum volume below 70 percent regardless of stability control agent type but recover rather rapidly. The rate of foam recovery depends on the foam size as well as the blowing agent composition. For the relatively small foams made during the tests of this example, ethyl chloride level as high as 40 percent is suitable. The preferred range of ethyl chloride is 10–30 percent and the most preferred range is 15–25 percent of the blowing agent mixture.

EXAMPLE II

In the tests of this example, ternary blowing agents consisting of R-114, dichlorodifluoromethane (R-12), and ethyl chloride (EtCl) were employed instead of the R-114/EtCl binary mixtures. The appartus, polymer, and test procedures were the same as in Example I. As the data in Table II shows, R-114/R-12/EtCl ternary blowing agents also provide low density foams having a large cross-section and satisfactory dimensional stability.

EXAMPLE III

The apparatus used in this example is a conventional screw-type extruder of 3½ (8.89 centimeters) screw diameter. The operating procedures are essentially the same as that employed in Example I and the extruder has essentially the same configuration as that employed in Example I except as hereinafter noted. The die opening is 2.25 inches (5.72 centimeters) in width and of variable height between about 0.100 inches to about 0.200 inches (0.25 to 0.51 centimeters).

The same type of polyethylene as used in Example I was fed into the extruder at a uniform rate of 290 pounds (132 kilograms) per hour. A 25 percent concentrate of a KEMAMIDE S-180 and KEMAMIDE S mixture was also fed in at a uniform rate of 18 pounds (8.16 kilograms) per hour. The effective level of the stability control agent was about 1.5 pph. Additionally, talc was fed in at a rate of about 1.3 pph for cell size control. A mixture of R-114 and ethyl chloride was injected into the extruder at an aimed rate of about 0.135 lb-moles (0.135 kg/moles per hundred pounds (hundred kilograms) of polymer. Actual rates deviated slightly from the aimed rate. The temperature of the extruder zones were set at 110° C. at the feeding zone 170°, 175°, and 190° C. for melting and metering zone and 170° C. at the mixing zone. The gel was cooled down to a uniform temperature of about 108° C. for foam expansion. The critical die gaps exceeded 0.150 inches (0.38 centimeters) for all formulations considered in this example. The foam samples were obtained at 0.150 inch (0.38 centimeter) die gap. Foam specimens of about 5 inches (12.7 centimeters) in length were cut from the strand for dimensional stability tests. The tests of this example were primarily designed to determine the optimum ratio of R-114 and ethyl chloride in producing a foam having 2.2 to 2.4 pcf (0.035 to 0.039 grams/cc) density.

As Table III shows, higher foam densities aid in dimensional stability. The higher density foams do not shrink as much as lower density foams produced in Example I. Blowing agents containing ethyl chloride as much as 40 percent, provide foams having reasonably good dimensional stability. Foams recover relatively slowly from shrinkage owing to their relatively large size and higher density. Again, a 70/30 R-114/EtCl mixture appears to be the preferred upper bound of ethyl chloride level providing foams having excellent dimensional stability.

EXAMPLE IV

The tests of Example III were repeated with different blowing agents The blowing agents employed in this example were ternary mixtures of R-114/R-12/EtCl. Table IV sets forth the test data. The ternary mixtures improves cross-sectional capability and foam appearance. The die can be opened wider with the ternary blowing agents and the foam surface had uniform smooth characteristics. Dimensional stability of the foams expanded with the ternary blowing agents is excellent both at the ambient and at the elevated temperature.

EXAMPLE V

The same apparatus and operating procedure used in Example III were used in this example. In Test V.1, low density polyethylene employed in Example III was employed while in Test V.2, there was used a 65/35 by weight blend of the same polyethylene and another low density polyethylene having 0.7 melt index and 0.922 g/cc density. KEMAMIDE S-180 brand stearyl stearamide was fed in concentrate form at a rate making its level one part per hundred parts of total polymer. The extrusion rate of total polymer was 200 pounds (90 kilograms) per hour throughout the tests in this example. Talc level was varied: 0.4 and 0.25 pph for Tests V.1 and V.2, respectively. A 75/25 by weight mixture of R-114/R-11 (trichlorofluoromethane) was used as the blowing agent for the tests. In Test V.2, the blowing agent level was substantially raised in order to see if the binary mixture performed adequately in manufacturing a lower density foam.

As the data in Table V show, the R-114/R-11 75/25 mixture provides low density foams having excellent dimensional stability when used together with a small amount of stearyl stearamide. In Test V.2, a lower density foam having relatively large cross-section and good quality skin is made. R-114/R-11 mixed blowing agent having a higher concentration of R-11 can be employed to produce a lower density foam without sacrificing foam dimensional stability and foam cross-sectional size.

EXAMPLE VI

Tests of Example V were repeated with R-114/R-12/R-11 ternary mixed blowing agents in this example. KEMAMIDE S-180 brand stearyl stearamide level was varied from test to test as shown in Table VI. The talc level was maintained at 0.4 pph in tests other than VI.5 where its level was dropped to 0.3 pph.

As shown in Table VI, all formulations provide foams having excellent dimensional stability. The ternary blowing agents produce foams having large cross-section and smooth skin quality.

TABLE I

| | Blowing Agent | | | Stability Control Agent | Critical | Foam Thick- | Maximum | Foam | Cell | Room Temp. Foam Stability | | | 150° F. |
| Test No. | Type (1) | Ratio (2) | Level (3) | Type (4) | Die Gap (5) | ness (6) | Cross-section (7) | Density (8) | Size (9) | Min. Vol. (10) | 1 wk (11) | 2 wk (12) | Foam Stability (13) |
| --- | --- | --- | --- | --- | --- | --- | --- | --- | --- | --- | --- | --- | --- |
| 1.1 | R-114/EtCl | 90/10 | 25.8 | 2/1 | 0.127 | 0.85 | 0.78 | 1.81 | 0.58 | 99 | 102 | 105 | 102 |
| 1.2 | R-114/EtCl | 90/10 | 24.9 | 1/1 | 0.125 | 0.82 | 0.74 | 1.74 | 0.54 | 90 | 91 | 96 | 100 |
| 1.3 | R-114/EtCl | 90/10 | 24.9 | 1/2 | 0.125 | 0.80 | 0.72 | 1.76 | 0.46 | 90 | 96 | 96 | 97 |
| 1.4 | R-114/EtCl | 80/20 | 24.5 | 2/1 | 0.133 | 0.95 | 0.93 | 1.76 | 0.95 | 88 | 97 | 101 | 102 |
| 1.5 | R-114/EtCl | 80/20 | 22.0 | 1/1 | 0.135 | 0.96 | 0.92 | 1.73 | 0.85 | 80 | 101 | 107 | 92 |
| 1.6 | R-114/EtCl | 80/20 | 22.4 | 1/2 | 0.130 | 0.89 | 0.85 | 1.64 | 0.70 | 82 | 93 | 101 | 86 |
| 1.7 | R-114/EtCl | 75/25 | 18.5 | 1/2 | 0.130 | 0.90 | 0.85 | 1.88 | 0.58 | 89 | 91 | 94 | 97 |
| 1.8 | R-114/EtCl | 70/30 | 19.7 | 2/1 | 0.127 | 0.93 | 0.91 | 1.66 | 1.35 | 80 | 105 | 110 | 100 |
| 1.9 | R-114/EtCl | 70/30 | 19.7 | 1/1 | 0.130 | 0.98 | 0.96 | 1.70 | 1.08 | 69 | 85 | 95 | 83 |
| 1.10 | R-114/EtCl | 70/30 | 19.7 | 1/2 | 0.130 | 0.96 | 0.94 | 1.71 | 0.81 | 73 | 88 | 98 | 82 |
| 1.11 | R-114/EtCl | 60/40 | 18.0 | 2/1 | 0.140 | 1.02 | 1.05 | 1.70 | 1.25 | 66 | 86 | 98 | 102 |
| 1.12 | R-114/EtCl | 60/40 | 18.3 | 1/1 | 0.130 | 0.93 | 0.89 | 1.68 | 1.25 | 64 | 81 | 91 | 79 |
| 1.13 | R-114/EtCl | 60/40 | 18.2 | 1/2 | 0.130 | 0.88 | 0.84 | 1.68 | 1.08 | 63 | 91 | 100 | 77 |
| 1.14 | R-114/EtCl | 50/50 | 19.7 | 2/1 | 0.130 | 1.02 | 1.03 | 1.67 | 1.80 | 49 | 66 | 81 | 82 |

Notes:
(1) R-114 = 1,2-dichlorotetrafluoroethane EtCl = ethyl chloride
(2) weight ratio
(3) parts of blowing agent mixed in per hundred parts of polymer
(4) mixture of KEMAMIDE[1] S-180 stearyl stearamide and KEMAMIDE S stearamide, respectively in the given weight ratio
(5) height of the die opening in inches at the threshold of prefoaming
(6) thickness of foam body in inches measured within about five minutes after extrusion
(7) cross-sectional area of foam body in square inches produced at the critical die gap
(8) density of foam body in pounds per cubic foot measured within about five minutes after extrusion
(9) cell size in mm in horizontal direction determined per ASTM D-3576
(10) minimum volume of foam body during aging at ambient temperature as percentage of initial volume which initial volume is measured within about five minutes after extrusion
(11), (12) volume of foam body as percentage of initial volume after aging for one and two week respectively
(13) minimum volume of foam body during aging at 150° F. as percentage of initial volume
[1]Trademark of Humko Chemical Division of Witco Chemical Corporation

TABLE II

| | Blowing Agent | | | Stability Control Agent | Critical | Foam Thick- | Maximum Cross- | Foam | Cell | Room Temp. Foam Stability | | | 150° F. |
| Test No. | Type (1) | Ratio (2) | Level (3) | Type (4) | Die Gap (5) | ness (6) | section (7) | Density (8) | Size (9) | Min. Vol. (10) | 1 wk (11) | 2 wk (12) | Foam Stability (13) |
| --- | --- | --- | --- | --- | --- | --- | --- | --- | --- | --- | --- | --- | --- |
| 11.1 | R-114/R-12/ EtCl | 37.5/ 37.5/25 | 16.7 | 1/2 | 0.125 | 0.87 | 0.83 | 1.84 | 0.68 | 78 | 83 | 87 | 86 |
| 11.2 | R-114/R-12/ EtCl | 35/35/ 30 | 15.2 | 1/2 | 0.130 | 0.97 | 0.96 | 1.85 | 1.01 | 80 | 82 | 87 | 81 |

Notes: (1) through (13) are the same as in Table I.

TABLE III

| Test No. | Blowing Agent Type (1) | Blowing Agent Ratio (2) | Blowing Agent Level (3) | Stability Control Agent Type (4) | Die Gap (5) | Foam Thickness (6) | Foam Width (7) | Foam Density (8) | Cell Size (9) | Room Temp. Foam Stability Min. Vol. (10) | Room Temp. Foam Stability 1 wk (11) | Room Temp. Foam Stability 2 wk (12) | 150° F. Foam Stability (13) |
|---|---|---|---|---|---|---|---|---|---|---|---|---|---|
| III.1 | R-114/EtCl | 80/20 | 17.3 | 2/1 | 0.150 | 1.65 | 7.32 | 2.33 | 0.95 | 92 | 94 | 95 | 98 |
| III.2 | R-114/EtCl | 80/20 | 17.3 | 1/1 | 0.150 | 1.84 | 7.40 | 2.25 | 0.95 | 91 | 93 | 92 | 97 |
| III.3 | R-114/EtCl | 75/25 | 16.3 | 2/1 | 0.150 | 1.60 | 7.52 | 2.41 | 1.01 | 95 | 98 | 98 | 94 |
| III.4 | R-114/EtCl | 75/25 | 16.3 | 1/1 | 0.150 | 1.68 | 7.45 | 2.37 | 0.77 | 97 | 99 | 100 | 94 |
| III.5 | R-114/EtCl | 70/30 | 15.7 | 2/1 | 0.150 | 1.97 | 7.55 | 2.30 | 1.01 | 87 | 89 | 89 | 91 |
| III.6 | R-114/EtCl | 70/30 | 15.4 | 1/1 | 0.150 | 1.89 | 7.52 | 2.36 | 0.90 | 89 | 91 | 90 | 86 |
| III.7 | R-114/EtCl | 65/35 | 14.4 | 2/1 | 0.150 | 1.83 | 7.62 | 2.38 | 1.25 | 82 | 82 | 85 | 88 |
| III.8 | R-114/EtCl | 63/35 | 14.5 | 1/1 | 0.150 | 1.84 | 7.60 | 2.36 | 1.16 | 81 | 81 | 82 | 85 |
| III.9 | R-114/EtCl | 60/40 | 14.2 | 2/1 | 0.150 | 1.96 | 7.62 | 2.42 | 1.16 | 81 | 82 | 84 | 83 |
| III.10 | R-114/EtCl | 60/40 | 13.5 | 1/1 | 0.150 | 1.93 | 7.56 | 2.44 | 1.25 | 77 | 79 | 79 | 75 |

Notes:
(1) through (4), (6), (8) through (13) are the same as in Table I
(5) height of the die opening in inches where the foam sample is taken
(7) width of foam body in inches measured within about five minutes after extrusion

TABLE IV

| Test No. | Blowing Agent Type (1) | Blowing Agent Ratio (2) | Blowing Agent Level (3) | Stability Control Agent Type (4) | Die Gap (5) | Foam Thickness (6) | Foam Width (7) | Foam Density (8) | Cell Size (9) | Room Temp. Foam Stability Min. Vol. (10) | Room Temp. Foam Stability 1 wk (11) | Room Temp. Foam Stability 2 wk (12) | 150° F. Foam Stability (13) |
|---|---|---|---|---|---|---|---|---|---|---|---|---|---|
| IV.1 | R-114/R-12/EtCl | 37.5/37.5/25 | 14.5 | 2/1 | >0.150 | 1.87 | 7.30 | 2.38 | 0.90 | 97 | 97 | 98 | 95 |
| IV.2 | R-114/R-12/EtCl | 35/35/30 | 14.5 | 2/1 | >0.150 | 1.90 | 7.41 | 2.43 | 0.85 | 97 | 98 | 99 | 89 |

Notes:
(1) R-12 = dichlorodifluoromethane
(2) through (4), (6), (8) through (13) are the same as in Table I
(5) the critical die gaps for tests IV.1 and IV.2 are greater than 0.150 inches but the samples were taken at 0.150 inches die gap
(7) width of foam body in inches measured within about five minutes after extrusion

TABLE V

| Test No. | Blowing Agent Type (1) | Blowing Agent Ratio (2) | Blowing Agent Level (3) | Stability Control Agent Type (4) | Die Gap (5) | Foam Thickness (6) | Foam Width (7) | Foam Density (8) | Cell Size (9) | Room Temp. Foam Stability Min. Vol. (10) | Room Temp. Foam Stability 1 wk (11) | Room Temp. Foam Stability 2 wk (12) | 150° F. Foam Stability (13) |
|---|---|---|---|---|---|---|---|---|---|---|---|---|---|
| V.1 | R-114/R-11 | 75/25 | 19.8 | 1 | 0.130 | 2.11 | 7.46 | 2.39 | 1.93 | 98 | 99 | 100 | 100 |
| V.2 | R-114/R-11 | 75/25 | 25.0 | 1 | 0.120 | 1.87 | 7.12 | 2.06 | 1.56 | 94 | 94 | 95 | 105 |

Notes:
(1) R-114 = 1,2-dichlorotetrafluoroethane, R-11 = trichlorofluoromethane
(2) through (3), (5) through (13) are the same as in Table III
(4) parts of KEMAMIDE[1] S-180 stearyl stearamide mixed in per hundred parts of polymer
[1]Trademark of Humko Chemical Division of Witco Chemical Corporation

TABLE VI

| Test No. | Blowing Agent Type (1) | Blowing Agent Ratio (2) | Blowing Agent Level (3) | Stability Control Agent Type (4) | Die Gap (5) | Foam Thickness (6) | Foam Width (7) | Foam Density (8) | Cell Size (9) | Room Temp. Foam Stability Min. Vol. (10) | Room Temp. Foam Stability 1 wk (11) | Room Temp. Foam Stability 2 wk (12) | 150° F. Foam Stability (13) |
|---|---|---|---|---|---|---|---|---|---|---|---|---|---|
| VI.1 | R-114/R-12/R-11 | 50/25/25 | 18.3 | 1 | 0.115 | 1.70 | 7.33 | 2.24 | 1.96 | 91 | 94 | 94 | 103 |
| VI.2 | R-114/R-12/R-11 | 50/25/25 | 18.3 | 1.5 | 0.120 | 1.73 | 7.23 | 2.24 | 1.79 | 93 | 94 | 95 | 106 |
| VI.3 | R-114/R-12/R-11 | 37.5/37.5/25 | 18.0 | 1 | 0.120 | 1.67 | 7.37 | 2.25 | 1.96 | 93 | 93 | 94 | 98 |
| VI.4 | R-114/R-12/R-11 | 37.5/37.5/25 | 18.0 | 1.5 | 0.120 | 1.70 | 7.18 | 2.21 | 1.78 | 93 | 93 | 93 | 98 |
| VI.5 | R-114/R-12/R-11 | 25/50/25 | 18.6 | 1 | 0.120 | 2.03 | 7.84 | 2.18 | 2.53 | 93 | 93 | 93 | 100 |
| VI.6 | R-114/R-12/ | 25/50/ | | | | | | | | | | | |

TABLE VI-continued

| Test No. | Blowing Agent Type (1) | Blowing Agent Ratio (2) | Blowing Agent Level (3) | Stability Control Agent Type (4) | Die Gap (5) | Foam Thickness (6) | Foam Width (7) | Foam Density (8) | Cell Size (9) | Room Temp. Foam Stability Min. Vol. (10) | Room Temp. Foam Stability 1 wk (11) | Room Temp. Foam Stability 2 wk (12) | 150° F. Foam Stability (13) |
|---|---|---|---|---|---|---|---|---|---|---|---|---|---|
| | R-11 | 25 | 18.6 | 1.5 | 0.120 | 2.06 | 7.75 | 2.11 | 2.11 | 92 | 93 | 94 | 99 |

Notes:
(1) R-12 = dichlorodifluoromethane, R-11 = trichloromonofluoromethane, R-114 = 1,2-dichlorotetrafluoroethane
(2) through (12) are the same as in Table III
(13) minimum or maximum volume of foam body during aging at 150° F. as percentage of initial volume

What is claimed is:

1. A process for preparing closed-cell olefin polymer foamed articles which comprises:
(a) heat plastifying a normally solid olefin polymer
(b) admixing said heat plastified resin under elevated temperature and pressure with
  (1) a stability control agent which functions to control the dimensional stability of the foam during the curing period, and
  (2) a mixed blowing agent selected from the group consisting of:
    (i) a mixture comprising 1,2-dichlorotetrafluoroethane, from about 60 to about 95 weight percent, and from about 5 to about 50 weight percent of ethyl chloride or trichloro-fluoromethane and
    (ii) a mixture which comprises from about 5 to about 85 weight percent of 1,2-dichlorotetrafluoroethane, from about 5 to about 85 percent of dichlorodifluoromethane and from about 5 to about 50 weight percent of a aliphatic hydrocarbon, a halogenated hydrocarbon compound physical blowing agent or mixture thereof having an atmospheric pressure boiling point ranging from about 0° C. to about 50° C., and
(c) extruding the resultant mixture into a zone of lower temperature and pressure to thereby form said olefin polymer foam, wherein the foam produced thereby does not shrink to less than about 80 percent of its initial volume at 65° C. for a prolonged period of time.

2. The process of claim 1, wherein the olefin polymer is a homopolymer of ethylene, a copolymer thereof with up to about 50 weight percent of vinyl acetate, propylene, 1-butene, butadiene, vinyl chloride, methyl methacrylate, acrylonitrile or acrylic acid.

3. The process of claim 1, wherein the olefin polymer is polyethylene.

4. The process of claim 1, wherein the stability control agent is a long chain fatty acid/polyol partial ester, a higher alkylamine, a saturated higher fatty acid amide, a complete ester of higher fatty acid, a copolymer of α-olefin and monoethylenically unsaturated carboxylic acid, or mixtures thereof.

5. The process of claim 1, wherein the aliphatic or halogenated hydrocarbon component of the mixed blowing agent of group (2) (ii) is ethyl chloride or trichlorofluoromethane.

6. The process of claim 1, wherein the aliphatic or halogenated hydrocarbon component of group (2) (ii) the mixed blowing agent is trichlorofluoromethane.

7. The process of claim 1, wherein the mixed blowing agent is employed in an amount of from about 0.013 to about 0.5 gram moles per 100 grams of olefin polymer.

8. The process of claim 1, wherein the stability control agent is stearamide, stearyl stearamide, or mixtures thereof and is employed in an amount of from about 0.1 to about 10 weight percent based upon the olefin polymer weight.

9. The process of claim 1, wherein the foam produced thereby has a cross-sectional area of greater than 50 square inches taken in a plane perpendicular to the direction of extrusion.

10. The process of claim 1, wherein the olefin foam produced has a density of from about 0.6 to about 6 pounds per cubic foot.

11. The process of claim 1, wherein the mixed blowing agent consists essentially of 1,2-dichlorotetrafluoroethane, dichlorodifluoromethane and ethyl chloride.

12. The process of claim 1, wherein the aliphatic or halogenated hydrocarbon compound of the mixed blowing agent of group (2) (ii) is ethyl chloride.

13. The process of claim 2, wherein the mixed blowing agent comprises 1,2-dichlorotetrafluoroethane, dichlorodifluoromethane and ethyl chloride.

14. The process of claim 13, wherein the stability control agent is a saturated higher fatty acid amide, a higher alkyl amine or a complete ester of a higher fatty acid, a long chain fatty acid/polyol ester, a copolymer of α-olefin and monoethylenically unsaturated carboxylic acid and mixtures thereof.

15. The process of claim 13, wherein the stability control agent is a saturated higher fatty acid amide.

* * * * *

UNITED STATES PATENT AND TRADEMARK OFFICE
CERTIFICATE OF CORRECTION

PATENT NO. : 4,894,395

DATED : January 16, 1990

INVENTOR(S) : Chung Poo Park

It is certified that error appears in the above-identified patent and that said Letters Patent is hereby corrected as shown below:

Column 11, line 27, "60" should correctly appear as --50--.

Column 11, line 29, after trichloro-fluoromethane, insert --or mixture thereof--.

Signed and Sealed this

Fifth Day of February, 1991

Attest:

HARRY F. MANBECK, JR.

Attesting Officer

Commissioner of Patents and Trademarks